UNITED STATES PATENT OFFICE.

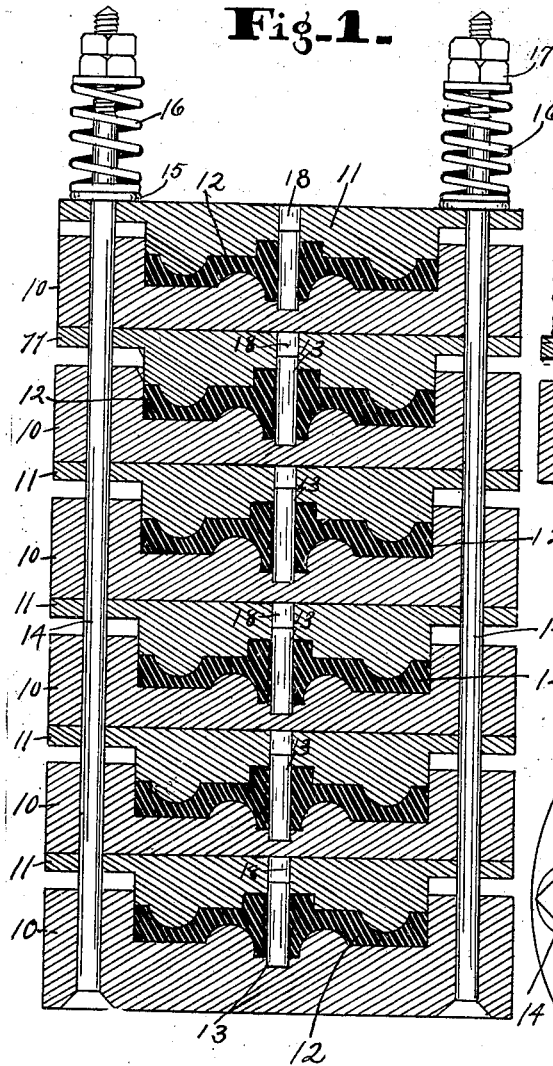

BENJAMIN P. REMY AND FRANK I. REMY, OF ANDERSON, INDIANA, ASSIGNORS TO THE REMY ELECTRIC COMPANY, OF ANDERSON, INDIANA, A CORPORATION.

VULCANIZING APPARATUS.

1,004,820.   Specification of Letters Patent.   Patented Oct. 3, 1911.

Application filed April 29, 1909. Serial No. 492,853.

*To all whom it may concern:*

Be it known that we, BENJAMIN P. REMY and FRANK I. REMY, of Anderson, county of Madison, and State of Indiana, have invented a certain new and useful Vulcanizing Apparatus; and we do hereby declare that the following is a full, clear, and exact description thereof, reference being had to the accompanying drawings, in which like letters refer to like parts.

The object of this invention is to provide an improved means for vulcanizing rubber, so that the mold will automatically contract with the contraction of the rubber during the vulcanization and nothing but the rubber will limit such contraction, and thus prevent bubbling and malformation or weakening of the rubber after it is vulcanized. To that end the molds are so arranged with reference to each other that nothing will limit the contracting movement thereof excepting the rubber. When the molds are formed of two members, as shown herein, one is preferably provided with a recess and the other with a piston-like projection fitting and operating in said recess so as to compress the rubber and not permit any of it to escape during the vulcanization. The quantity of the rubber placed in the mold is predetermined and since none can escape, an article of exact weight and size can be produced. The side flanges of the mold are so formed with relation to each other that they will not touch as long as there is any rubber in the mold, so that the sides never come in contact during vulcanization, and there is no limit to the contracting movement of the mold members excepting the rubber, and it is this feature which is of particular value in the formation of homogeneous, hard rubber articles with a smooth hard surface, free from blisters, bubbles or other malformation. Likewise, the feature of the invention just explained enables metal articles, or the like, to be securely and accurately embedded and located in the hard rubber. To that end the said metal object to be embedded in the rubber is mounted in connection with or held in some manner by the mold members.

The nature of the invention will be understood from the accompanying drawings and the following description and claims:

In the drawings Figure 1 is a central vertical section through a set of vulcanizing molds, whereby a half dozen hard rubber articles are simultaneously formed. Fig. 2 is a central section through one mold and the compressing means, and showing the mold members in position after the rubber has been placed therein and before vulcanization thereof. Fig. 3 is a plan view of Fig. 1.

Each mold consists of a lower member 10 and an upper member 11. As herein shown, they are disk-like and their adjacent surfaces are suitably formed to give the desired shape to the hard rubber articles 12 after their vulcanization. The lower member 10 of each mold has a recess in its upper surface to receive the rubber 12 that is to be vulcanized. There is a central annular downwardly extending portion from the upper member of the mold that projects and operates piston-like in said recess in the lower mold member for the purpose of compressing the rubber therein. The central downward extension from the upper member of the mold preferably fits snugly in the recess so as to prevent the escape of rubber while soft during vulcanization, and also said extension is of such length that the side portions of the mold members will not come in contact with each other during vulcanization or as long as there is any rubber in the mold, but only the compressed and contracting rubber will resist and limit the contracting movement of the mold members.

Metal objects, such as a pin 13, are embedded in the rubber by being mounted in connection with the mold members. Thus as shown, the lower mold member is provided with a recess in which the pin 13 is mounted and held. The upper member is provided with a hole 18 in which the upper end of the pin 13 projects and by which it is guided during the contracting movement of the mold members. Since the rubber during vulcanization in mold members arranged as herein specified is not subject to lateral movement or misplacement, and the mold members hold the article in exact position, there is no practical difficulty in such object as the pin 13 not being accurately positioned when the hard rubber article is finished.

We do not wish to limit the invention to the use of a mere article like a pin as other objects can also be used.

Through the mold members a pair of rods 14 extend that are stationary preferably as to one mold member; and upon the upper member a washer 15 surrounds each rod 14, and upon that a spiral spring 16 is placed about the rod 14 and compressed by the nuts 17, which are on the threaded end of the rod 14. Hence the tension of the spring 16 may be adjusted and thus a constantly acting influence is exerted on the mold members to bring them together during the vulcanization.

After the unvulcanized rubber 12 has been placed in the mold and the parts arranged as shown, the mold is subjected to heat for vulcanizing the rubber, and during such step of the process the upper mold is moved by the springs to the dotted line position in Fig. 2, after the rubber contracts from its size shown in Fig. 2 to that shown in Fig. 1. This close following up of the upper mold without any limiting means other than the rubber prevents bubbling and malformation of the hard rubber article and permits objects like the pin 13 to be securely embedded therein.

As shown in Fig. 1, we preferably combine a number of molds on a pair of rods 14, so that several hard rubber articles may be simultaneously vulcanized, and one pair of springs 16 compress every pair of molds. This increases the output of such articles.

What we claim as our invention and desire to secure by Letters Patent is:

A vulcanizing mold having a plurality of mold members arranged with reference to each other to form a rubber chamber from which the rubber cannot escape during vulcanization and so that the compressing movement of said members will not be limited excepting by the rubber, r ds extending through all of said mold members, and springs on said rods acting against said mold members for compressing the same.

In witness whereof, we have hereunto affixed our signatures in the presence of the witnesses herein named.

BENJAMIN P. REMY.
FRANK I. REMY.

Witnesses:
  JOHN W. LOVETT,
  G. B. SLAYMAKER.